UNITED STATES PATENT OFFICE.

EVA JAMES CLARK, OF GLENDIVE, MONTANA.

FACE-BLEACH.

No. 920,824.  Specification of Letters Patent.  Patented May 4, 1909.

Application filed March 16, 1905. Serial No. 250,385.

*To all whom it may concern:*

Be it known that I, EVA JAMES CLARK, a citizen of the United States, residing at Glendive, in the county of Dawson and State of Montana, have invented certain new and useful Improvements in Face-Bleaches, of which the following is a specification.

My invention consists of a new and useful composition of matter designed to be used as a facial bleacher and whitener to remove tan, sun-burns, freckles, etc., and at the same time to exert a curative, as well as antiseptic effect upon the epidermis.

In making my composition I first secure the juice of practically ripe cucumbers by boiling and straining the cucumbers. I then take eight ounces of the cucumber juice and an equal quantity of alcohol and combine the same with one ounce of powdered soap letting the same stand over night, or an equivalent length of time, shaking the same well at intervals. I then take four pints of cucumber juice, one tablespoonful of tincture of benzoin, two ounces of oil of sweet almonds, and two teaspoonfuls of boric acid thoroughly shaking the ingredients together. The composition thus obtained may be applied to the skin without any injurious effects, in fact will act as a curative, antiseptic agent. Where the skin is tanned, sun-burned or covered with freckles the application of the solution will thoroughly remove the same, leaving the skin soft and white. By the use of my composition the disagreeable facial effects of summer outings may be quickly removed.

Having now described my invention, what I claim as new, and desire to secure by Letters Patent, is:—

The process of making a face bleach consisting in extracting the juice of ripe cucumbers by boiling and straining, mixing eight ounces of the juice with an equal volume of alcohol and with one ounce of powdered soap and shaking the mixture at intervals during twelve hours and then thoroughly incorporating the resultant mixture with four pints of cucumber juice, one tablespoonful of tincture of benzoin, two ounces of oil of sweet almonds and two teaspoonfuls of boric acid.

In testimony whereof I affix my signature in presence of two witnesses.

EVA JAMES CLARK.

Witnesses:
H. S. JOHNSON,
EMILY F. OTIS.